Jan. 8, 1952    F. A. ERICKSON    2,581,396
STABILIZER FOR ROTARY WING AIRCRAFT
Original Filed Dec. 5, 1947    2 SHEETS—SHEET 1
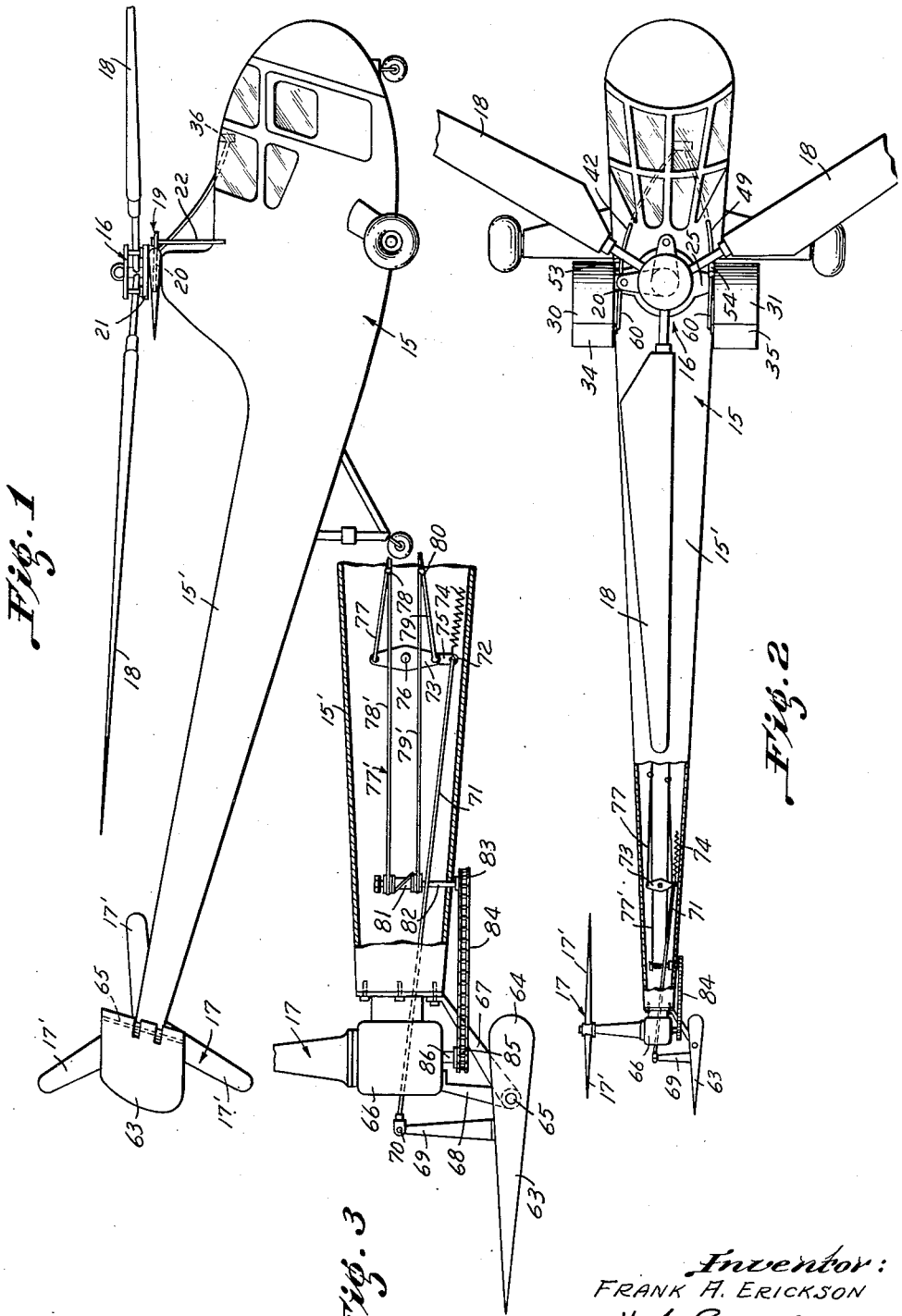

Jan. 8, 1952 F. A. ERICKSON 2,581,396
STABILIZER FOR ROTARY WING AIRCRAFT
Original Filed Dec. 5, 1947 2 SHEETS—SHEET 2
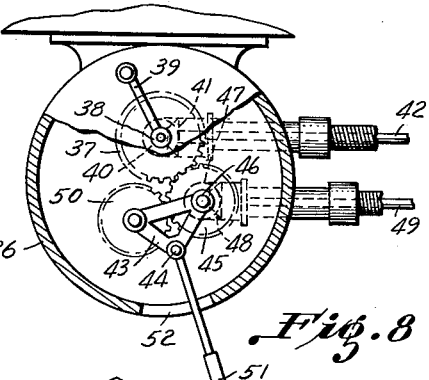
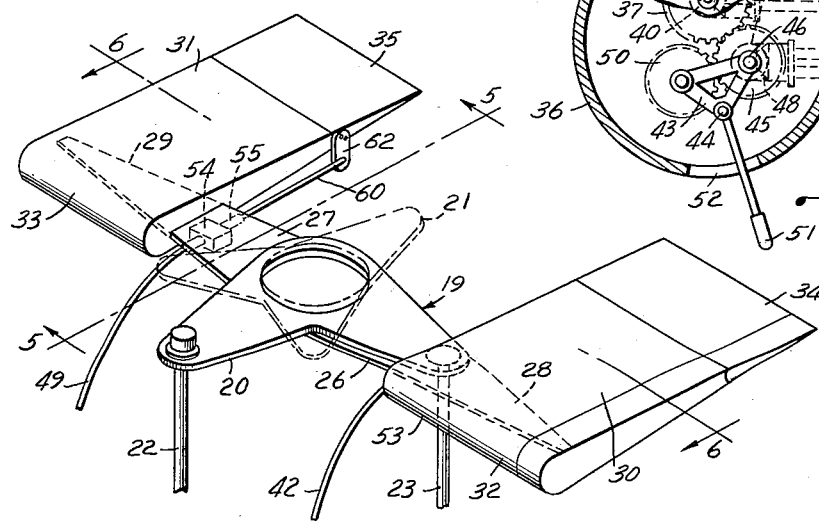
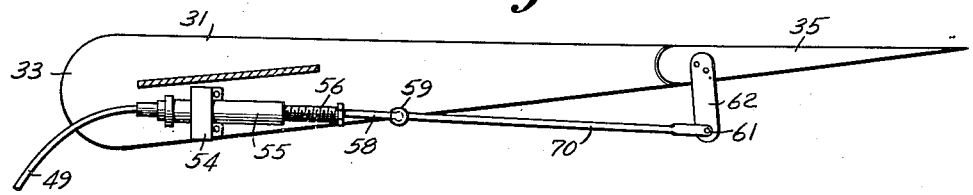
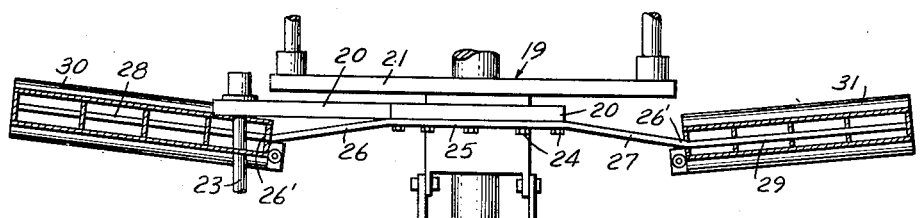
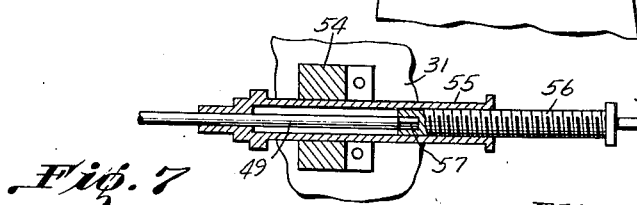
Inventor:
FRANK A. ERICKSON
By H. L. Soffen
Attorney Patented Jan. 8, 1952

2,581,396

UNITED STATES PATENT OFFICE 2,581,396

STABILIZER FOR ROTARY WING AIRCRAFT

Frank A. Erickson, Elizabeth City, N. C.

Original application December 5, 1947, Serial No. 790,005. Divided and this application August 9, 1951, Serial No. 241,148

1 Claim. (Cl. 244—17.19)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This application is a division of my copending application Serial No. 790,005, filed December 5, 1947, for "Stabilizers for Rotary Wing Aircraft."

My invention relates to rotary wing aircraft, and more particularly to stabilizers for such aircraft.

The rotary wing aircraft or helicopter is inherently unstable in cruising flight. Attempts have been made to eliminate this inherent instability, mainly by the employment of vertical or horizontal stabilizers, or both, such stabilizers being mounted upon the fuselage of the aircraft to directly control the attitude of the same. A disadvantage of this type of stabilizer lies in the fact that it must have a relatively large surface area in order to have an appreciable effect upon the attitude of the fuselage. Accordingly, the present invention is concerned with the stabilizers which are relatively small in area and which will produce longitudinal, lateral and directional stability in helicopters through their effect on the cyclic pitch controls of the sustaining rotor, and rudder controls of the torque compensating rotor of the aircraft. The stabilizers embodying the invention are applicable to those helicopters in which longitudinal and lateral control is obtained by varying the pitch of sustaining rotor blades during their cycle of rotation, and directional control by varying the pitch of the torque compensating rotor on single sustaining rotor types.

A primary object of this invention is to provide means for stabilizing rotary wing aircraft to maintain a given condition of flight through cruising speed range.

A further object of the invention is to provide a universal stabilizing system for helicopters which will produce sufficient stability in all reference planes so that the aircraft will maintain cruising flight conditions for several minutes, without using the cyclic pitch or rudder controls.

A further object is to provide stabilizers of the above mentioned type which provide sufficient stability to permit the use of a standard aeroplane type automatic pilot.

A further object is to preload the cyclic pitch control system by the action of a stabilizer unit mounted upon the swash plate, thereby damping cyclic pitch stick vibrations.

A further object is to provide a longitudinal and lateral stabilizing unit for helicopters which eliminates the need for bungee or spring trimming devices in the cyclic pitch control system.

A further object is to provide a directional stabilizer which may be used together with or independently of the longitudinal and lateral stabilizer unit of the swash plate to obtain directional stability in single sustaining rotor types with torque compensating rotor.

Another object is to provide a directional stabilizer for use on single sustaining rotor type helicopters having a torque compensating rotor which can be set to automatically increase torque compensating rotor pitch, to compensate for torque in hovering flight and also to automatically reduce torque compensating rotor pitch to that required for cruising flight.

A still further object of the invention is to provide a stabilizing system for rotary wing aircraft which will not interfere with precise hovering or slow speed maneuvers of the aircraft.

Other objects and advantages of the invention will become apparent during the course of the following description:

In the accompanying drawings, forming a part of this application, and in which like numerals are employed to designate parts throughout the same, Figure 1 is a side elevation of a single sustaining rotor helicopter, equipped with stabilizers embodying the invention.

Figure 2 is a plan view of the same, partly broken away, and partly in section.

Figure 3 is an enlarged fragmentary plan view of the rear portion of the fuselage, partly in horizontal section.

Figure 4 is an enlarged fragmentary perspective view of a swash plate and longitudinal and lateral stabilizers mounted thereon.

Figure 5 is a vertical longitudinal section taken on the line 5—5 of Figure 4.

Figure 6 is a vertical transverse section taken on the line 6—6 of Figure 4.

Figure 7 is an enlarged fragmentary sectional view showing a screw drive for trim-tabs, and Figure 8 is an enlarged fragmentary side elevation of a gear box and crank for controlling the movement of the trim-tabs and shown partly in section.

Referring to the drawings, the numeral 15 designates a conventional single sustaining rotor type of helicopter having a fuselage 15' and including a sustaining or lifting rotor 16 and a torque compensating rotor 17 having variable pitch blades 17'.

The sustaining rotor 16 includes three variable pitch rotor blades 18 which have their pitch changed during each cycle of rotation, through the action of a conventional cyclic pitch control system. This cyclic pitch control system includes a swash plate assembly 19 having a lower non-rotatable swash plate section 20 and an upper rotatable swash plate section 21. Generally vertical push-pull control rods 22 and 23 are connected to the lower swash plate section 20 in the usual manner and are adapted to be shifted longitudinally for tilting the swash plate section 20 longitudinally or laterally, with respect to the fuselage 15'.

Disposed beneath the lower swash plate section 20 and rigidly secured thereto by means of a circular group of bolts 24, or the like, is a rigid stabilizer mounting plate 25, including outwardly laterally projecting portions or arms 26 and 27. The arms 26 and 27 are bent downwardly slightly adjacent to the inner portion of the plate 25 beneath swash plate section 20, and upwardly at outer points 26' to form outer lateral inclined portions 28 and 29. A permanent or built-in dihedral angle is thus formed in stabilizer mounting plate 25. The outer portions 28 and 29 of mounting plate 25 are elongated and tapered toward their outermost ends, and these outer portions 28 and 29 have rigidly mounted thereon generally horizontal rectangular airfoils or stabilizer vanes 30 and 31. The outer portions 28 and 29 extend into and pass laterally through the airfoils 30 and 31, as shown, and are suitably rigidly anchored within the same. The portions 28 and 29 of mounting plate 25 are arranged near the frontal edges 32 and 33 of the airfoils, as shown in Figure 4. The left hand airfoil 30 is slightly wider than the right hand airfoil 31, so that it may provide slightly greater lift to compensate for gyroscopic effect which is transmitted from the sustaining rotor 16. The airfoils or stabilizers 30 and 31 carry adjustable trim-tabs 34 and 35, pivotally connected to the rear ends of airfoils 30 and 31, and adapted to swing vertically with respect to the same.

Means are provided for manually adjusting the trim-tabs 34 and 35 from the cockpit. Such means include a gear box or housing 36 mounted in a convenient location for the use of the pilot, preferably in the upper forward part of the cockpit, as shown in Figure 1. Arranged within the housing 36, which is shown more clearly in Figure 8, is a gear 37 mounted upon a transverse shaft 38 journaled in the sides of the housing 36. A manually operated crank 39 is secured to one end of shaft 38, and is disposed on one outer side of the housing 36. A bevel gear 40 is mounted upon shaft 38 and is in meshed engagement with a bevel gear 41, secured to the adjacent end of flexible drive shaft 42. The bevel gears 40 and 41 are disposed outside of the housing 36. A triangular frame or yoke 43 is arranged within housing 36, and pivotally connected to the sides of the housing through a pin 44, or the like. Rotatably mounted upon the frame 43 at one inner corner of the same is a gear 45 connected with a shaft 46 which rotates with gear 45. A bevel gear 47 is mounted upon shaft 46 to rotate therewith. The bevel gear 47 meshes with a bevel gear 48 secured to the adjacent end of a flexible drive shaft 49. The bevel gears 47 and 48 are disposed outside of housing 36. Rotatably mounted upon the opposite inner corner of frame 43 is an idler gear 50 which is in permanent meshing engagement with the gear 45, as shown. A gear shifting handle 51 is provided and is rigidly connected to the frame 43. This handle 51 serves as means for swinging the frame 43 about pin 44 for shifting gears 45 and 50 into and out of engagement with the gear 37. This handle 51 provides a means for swinging the frame 43 about the pin 44 for shifting gears 45 and 50 into and out of engagement with gear 37. The handle 51 operates in a slot 52 in housing 36, as shown in Figure 8.

The flexible shafts 42 and 49 extend rearwardly and upwardly toward the airfoils 30 and 31 (Figure 2) and are arranged near the inboard edges of the airfoils. Suitable brackets 53 and 54 are rigidly secured to the inboard edges of the airfoils 30 and 31, near their frontal edges 32 and 33, as shown in Figures 2 and 4. Rigidly held in place by each of the brackets 53 and 54 is a longitudinally extending screw threaded rod 56. The rod 56 is turnable and will travel longitudinally within the sleeve 55 in either direction. The rod 56 has a forward socket 57 into which the adjacent end of one flexible shaft is secured for rotation with the rod 56 (see Figure 7). Each rod 56 has a rearwardly longitudinally extending portion 58 connected through a ball and socket joint 59 with a longitudinally extending connecting rod 60, in turn pivotally connected at 61 to a depending arm or tab 62 rigidly secured to the inboard edge of the pivoted trim-tab adjacent thereto.

It is thus seen that the airfoils 30 and 31 constitute a single compact stabilizing unit for the lower swash plate section 20. The airfoils 30 and 31 have a relatively small total surface area, because they need only be capable of producing a change in the attitude of the swash plate section 20 and not in the fuselage of the helicopter. In some installations, the total combined areas of both airfoils 30 and 31 are approximately only five and three-fourths square feet.

Arranged at the rear end 15' of the fuselage 15 and laterally opposite to the torque compensating rotor 17 is a vertical directional stabilizer vane or airfoil 63. This airfoil 63 has a frontal edge 64 and the aerofoil is pivotally mounted upon a generally vertical shaft 65 and adapted to swing horizontally upon the same. The shaft 65, carrying the airfoil 63, is rigidly connected to the rear end of the fuselage and to the torque compensating rotor gear box or housing 66 by means of suitable rigid brackets 67 and 68 respectively. Rigidly secured to the inboard side of airfoil 63 and arranged generally at right angles to the same and extending laterally therefrom is an arm 69 pivotally connected at 70 with a push-pull rod 71. This rod 71 extends into the fuselage and projects forwardly longitudinally in the same and is pivotally connected at 72 with a transverse crank-lever 73. A retractible coil spring 74 is connected at its forward end to the fuselage structure and at its rear end 75 it is connected to the end of crank-lever 73 adjacent to rod 71. The transverse crank-lever 73 has a fixed pivot 76 near its longitudinal center and is adapted to be swung horizontally about such pivot. At its end remote from rod 71, crank-lever 73 is connected to a cable 77 which is connected into one cable run 78' of a manually operated pitch control cable 77' for the torque compensating rotor 17. Cable 77 being connected into the run 78' at 78, as shown in Figure 3. Laterally inwardly of the coil spring 74, crank-lever 73 is connected to a cable 79 which is connected in the opposite run 79' of cable 77', as at 80. The cable 77' is wound upon a spool or drum 81 mounted upon a rotatable transverse horizontal shaft 82. The cable 77' is so wound upon spool or drum 81 that when one of its runs is wound up upon the spool, the other run is let out therefrom. The runs 78' and 79' of cable 77' extend forwardly in the fuselage of the helicopter and are connected in a conventional manner to manually operated foot pedals in the cockpit, which are actuated to vary the pitch of the blades 17' of torque compensating rotor 17. The rotatable shaft 82 carries a sprocket wheel 83 at its outer end and a sprocket chain 84 engages about the sprocket wheel 83, and is also operatively connected with a sprocket wheel 85 mounted upon a rotatable shaft extension 86, which changes the pitch of blades 17, when rotated.

In operation, the horizontal airfoils or stabilizers 30 and 31 provide both lateral and longitudinal stability through their reaction upon the lower swash plate section 20 during forward flight. The airfoils 30 and 31 place a load in the cyclic pitch control system which has the effect of damping out stick vibrations during cruising flight. The trim-tabs 34 and 35 are actuated from the cockpit by means of the crank 39 and gearing shift handle 51. Longitudinal trim is obtained by moving the trim-tabs together, the lateral trim by moving them differentially. This is accomplished by turning crank 39 and swinging gear shifting handle 51. In order to swing trim-tabs together and in the same direction, handle 51 should be swung to the left (Figure 8) so that idler gear 50 meshes with gear 37. To move the trim-tabs together in opposite directions, the handle 51 should be swung to its right position shown in Figure 8. The trim-tabs may be moved into any relative position found to be necessary. The airfoils 30 and 31 have practically no effect during hovering flight and do not interfere with controllability of the helicopter at that time. All forces causing unbalance in the cyclic pitch controls tend to be balanced out by the airfoils 30 and 31. The built-in dihedral angle of these airfoils produces added lateral stability. It is believed that the addition of the airfoils 30 and 31 is enough to provide sufficient stability and damping effect to permit the use of a standard aeroplane-type automatic pilot.

Directional stability and torque compensation are obtained by means of the vertical airfoil 63 which is acted upon by spring 74 tending to apply full torque in hovering flight. The airfoil 63 could be arranged anywhere on the fuselage where the airflow is not disturbed, but the preferred location is shown and described. Spring 74 places a constant load on the airfoil 63 tending to apply full left rudder control by increasing the pitch of the torque compensating rotor blades 17'. The inflow of air past airfoil 63 to the torque compensating rotor aids the spring 74 in holding left rudder control in hovering flight. In forward flight, airfoil 63 tends to align itself with the relative wind and opposes the action of the spring 74. The effectiveness of this action of airfoil 63 increases with increase in speed. At intermediate speeds, spring 74 will apply a small degree of left rudder control to compensate for the reduced torque reaction. At high speeds, it will practically feather the torque compensating rotor, as little or no torque compensation is required at high speeds. When flying speed is reduced, spring 74 partially overcomes the effect of the airfoil, as the airfoil's effectiveness is reduced with the reduced flow of air over it. In hovering flight, the airfoil will cut out completely, allowing the spring to apply full left rudder control.

The helicopter fuselage is affected by side wind gusts in the same manner as a wind sock, that is, it will swing with the nose of the aircraft into the gust. The inertia of airfoil 63 being much less than that of the fuselage permits the airfoil to be deflected by the gust before the fuselage is deflected. Assuming that a wind gust strikes the right side of the aircraft in cruising flight, airfoil 63 will be deflected to the left, looking forward in Figure 3, rod 71 will be shifted longitudinally forwardly turning crank-lever 73 counter-clockwise. Crank-lever 73 in turn will move the directional controls through cables 77 and 77' increasing the pitch of torque compensating rotor blades 17' which oppose the side wind gust, tending to prevent the aircraft from turning into the gust. Crank-lever 73 moves cables 77 and 77' which cause drum 81 and shaft 82 to rotate, driving sprocket chain 84 and shaft extension 86 to change the pitch of torque compensating rotor blades 17'. The separate runs 78' and 79' of cable 77' may always be manually operated by the foot pedals in the cockpit. In addition, airfoil 63 automatically moves the runs 78' and 79' through the medium of the crank-lever 73 and associated elements.

It is to be understood that the form of the invention herewith shown and described is a preferred example of the same, and that various changes in the shape, size and arrangement of parts may be resorted to, without departing from the spirit of the invention or the scope of the claim.

What is claimed is:

In a helicopter, a fuselage, a sustaining rotor mounted upon the fuselage, cyclic pitch control means for the sustaining rotor including a non-rotatable swash plate section, stabilizer vanes mounted upon the non-rotatable swash plate section, a variable pitch torque compensating rotor mounted upon the fuselage, a directional stabilizer vane mounted upon the fuselage, means to vary the pitch of the torque compensating rotor, and connecting means between the directional stabilizer vane and said means to vary the pitch of the torque compensating rotor in response to changes in airflow relative to said directional stabilizer vane.

FRANK A. ERICKSON.

REFERENCES CITED

The following references are of record in the file of this patent:

UNITED STATES PATENTS

| Number | Name | Date |
|---|---|---|
| 1,800,470 | Oehmichen | Apr. 14, 1931 |
| 2,443,192 | Moeller | June 15, 1948 |
| 2,481,750 | Hiller | Sept. 13, 1949 |

FOREIGN PATENTS

| Number | Country | Date |
|---|---|---|
| 844,048 | France | Apr. 11, 1939 |